United States Patent [19]
Lau et al.

[11] Patent Number: 5,777,906
[45] Date of Patent: Jul. 7, 1998

[54] LEFT SHIFT OVERFLOW DETECTION

[75] Inventors: Hon Shing Lau; Le Tieu Ly, both of Allentown, Pa.

[73] Assignee: Lucent Technologies Inc, Murray Hill, N.J.

[21] Appl. No.: 660,145

[22] Filed: Jun. 7, 1996

[51] Int. Cl.$^6$ ............................................. G06F 7/00
[52] U.S. Cl. ........................................... 364/715.08
[58] Field of Search ...................... 364/715.08, 715.04, 364/737; 377/69

[56] References Cited

U.S. PATENT DOCUMENTS 4,872,128  10/1989  Shimizu ................. 364/715.08
5,497,340  3/1996   Uramoto et al. ......... 364/715.08

Primary Examiner—Tan V. Mai

[57] ABSTRACT

An integrated circuit including a circuit for determining shift overflow in a binary digital circuit having an n-bit shift data and an m-bit shift amount. The device has a logic array for producing an n-bit output from the m-bit shift amount; a conversion circuit for selectively converting the sign of an n-bit shift data; and a combination of OR and AND logical gates for logically combining the selectively converted n-bit shift data and the n-bit output producing an overflow output.

16 Claims, 4 Drawing Sheets

| INPUT | | OUTPUT OF MASK PROGRAMMABLE ARRAY CIRCUIT |
|---|---|---|
| | BIT | 0123456789...                    n-1 |
| 0 | | 0111111111111111111111111111111111...11 |
| 1 | | 0011111111111111111111111111111111...11 |
| 2 | | 0001111111111111111111111111111111...11 |
| 3 | | 0000111111111111111111111111111111...11 |
| 4 | | 0000011111111111111111111111111111...11 |
| 5 | | 0000001111111111111111111111111111...11 |
| 6 | | 0000000111111111111111111111111111...11 |
| 7 | | 0000000011111111111111111111111111...11 |
| 8 | | 0000000001111111111111111111111111...11 |
| 9 | | 0000000000111111111111111111111111...11 |
| 10 | | 0000000000011111111111111111111111...11 |
| 11 | | 0000000000001111111111111111111111...11 |
| 12 | | 0000000000000111111111111111111111...11 |
| 13 | | 0000000000000011111111111111111111...11 |
| 14 | | 0000000000000001111111111111111111...11 |
| 15 | | 0000000000000000111111111111111111...11 |
| 16 | | 0000000000000000011111111111111111...11 |
| 17 | | 0000000000000000001111111111111111...11 |
| 18 | | 0000000000000000000111111111111111...11 |
| 19 | | 0000000000000000000011111111111111...11 |
| 20 | | 0000000000000000000001111111111111...11 |
| 21 | | 0000000000000000000000111111111111...11 |
| 22 | | 0000000000000000000000011111111111...11 |
| 23 | | 0000000000000000000000001111111111...11 |
| 24 | | 0000000000000000000000000111111111...11 |
| 25 | | 0000000000000000000000000011111111...11 |
| 26 | | 0000000000000000000000000001111111...11 |
| 27 | | 0000000000000000000000000000111111...11 |
| 28 | | 0000000000000000000000000000011111...11 |
| 29 | | 0000000000000000000000000000001111...11 |
| 30 | | 0000000000000000000000000000000111...11 |
| 31 | | 0000000000000000000000000000000011...11 |
| 32 | | 0000000000000000000000000000000001...11 |
| 33 | | 0000000000000000000000000000000000...11 |
| 34 | | 0000000000000000000000000000000000...11 |
| . | | |
| i-1 | | 0000000000000000000000000000000000...01 |
| i | | 0000000000000000000000000000000000...00 |

FIG. 3A

| INPUT | OUTPUT OF MASK PROGRAMMABLE ARRAY CIRCUIT |
|---|---|
| BIT | 0123456789... n-1 |
| 0 | 1000000000000000000000000000000000...00 |
| 1 | 1100000000000000000000000000000000...00 |
| 2 | 1110000000000000000000000000000000...00 |
| 3 | 1111000000000000000000000000000000...00 |
| 4 | 1111100000000000000000000000000000...00 |
| 5 | 1111110000000000000000000000000000...00 |
| 6 | 1111111000000000000000000000000000...00 |
| 7 | 1111111100000000000000000000000000...00 |
| 8 | 1111111110000000000000000000000000...00 |
| 9 | 1111111111000000000000000000000000...00 |
| 10 | 1111111111100000000000000000000000...00 |
| 11 | 1111111111110000000000000000000000...00 |
| 12 | 1111111111111000000000000000000000...00 |
| 13 | 1111111111111100000000000000000000...00 |
| 14 | 1111111111111110000000000000000000...00 |
| 15 | 1111111111111111000000000000000000...00 |
| 16 | 1111111111111111100000000000000000...00 |
| 17 | 1111111111111111110000000000000000...00 |
| 18 | 1111111111111111111000000000000000...00 |
| 19 | 1111111111111111111100000000000000...00 |
| 20 | 1111111111111111111110000000000000...00 |
| 21 | 1111111111111111111111000000000000...00 |
| 22 | 1111111111111111111111100000000000...00 |
| 23 | 1111111111111111111111110000000000...00 |
| 24 | 1111111111111111111111111000000000...00 |
| 25 | 1111111111111111111111111100000000...00 |
| 26 | 1111111111111111111111111110000000...00 |
| 27 | 1111111111111111111111111111000000...00 |
| 28 | 1111111111111111111111111111100000...00 |
| 29 | 1111111111111111111111111111110000...00 |
| 30 | 1111111111111111111111111111111000...00 |
| 31 | 1111111111111111111111111111111100...00 |
| 32 | 1111111111111111111111111111111110...00 |
| 33 | 1111111111111111111111111111111111...00 |
| 34 | 1111111111111111111111111111111111...00 |
| . | |
| i-1 | 1111111111111111111111111111111111...10 |
| i | 1111111111111111111111111111111111...11 |

LEFT SHIFT OVERFLOW DETECTION

FIELD OF THE INVENTION

This invention relates generally to digital circuits, and more particularly to a scheme for optimizing the performance of such digital circuits.

BACKGROUND OF THE INVENTION

Digital circuits including microprocessors, microcontrollers and digital signal processors (DSP) are well-known devices used in many consumer, non-consumer, and wireless applications today. The digital signal processor has been developed to manipulate analog signals in digital form, and can be utilized in image processing, telecommunications, audio processing, anti-skid brakes, multimedia presentations and other areas. These applications require high speed real time processing and involve a large number of digital calculations. A digital circuit is desirable to perform the bit manipulation or left shift operation at a high speed. However, overflow typically occurs in such bit manipulation or left shift operation. When the overflow occurs, the result of the left shift operation must be detected and/or corrected prior to the next arithmetic operation.

In a DSP left shift overflow detection is typically implemented by adding the n-bit shift value which is decoded from the $\lceil \log_2 n \rceil$-bit shift amount n-bit shift data. The value of $\lceil \log_2 n \rceil$ is defined as the integer value of $\log_2 n$ rounded up. For any n-bit left shift operation, an n-bit adder is needed to detect the overflow condition. If there is no carry out bit from the n-bit adder there is an overflow, while if there is a carry out bit from the n-bit adder then there is no overflow. The delay of decoding the shift amount to the shift value and adding the shift value to the shift data is relatively large.

Therefore, there is a need for the overflow detection to be performed as fast as possible in a high speed digital processor.

SUMMARY OF THE INVENTION

In accordance with the present invention, there is provided an integrated circuit including a circuit for determining shift overflow in a binary digital circuit having an n-bit shift data and an m-bit shift amount.

The device has a logic array for producing an n-bit output from the m-bit shift amount; a conversion circuit for selectively converting the sign of an n-bit shift data; and a combination of OR and AND logical gates for logically combining the selectively converted n-bit shift data and the n-bit output producing an overflow output.

In accordance with the present invention a method is described for determining shift overflow in a binary digital circuit having an n-bit shift data and an m-bit shift amount.

BRIEF DESCRIPTION OF THE DRAWINGS

A more complete understanding of the present invention may be obtained from consideration of the following description in conjunction with the drawings in which:

FIGS. 3a and 3b are details of an n-bit mask programmable array circuit output.

DETAILED DESCRIPTION OF VARIOUS ILLUSTRATIVE EMBODIMENTS

Although the present invention is particularly well suited for use in a digital signal processor (DSP) for left shift overflow detection and shall be described with respect to this application, the methods and apparatus disclosed here can be applied to other schemes employing shifted data.

Figure 1:
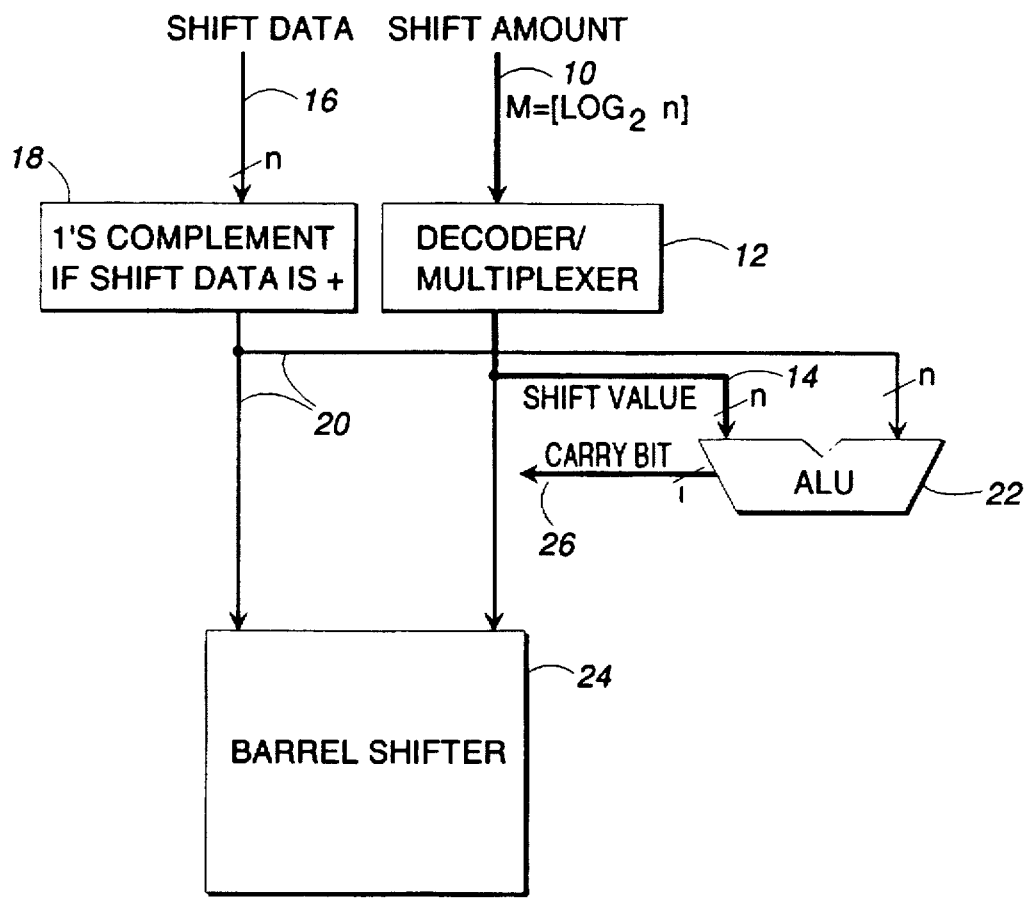
FIG. 1 is a typical DSP shift overflow detection logic circuit.

Referring to FIG. 1 there is shown a typical DSP shift overflow detection logic circuit. In a DSP left shift overflow detection is typically implemented by adding the shift value, in the reversed order. A shift amount 10 is coupled to a decoder/multiplexer 12. The decoder/multiplexer 12 decodes the $\lceil \log_2 n \rceil$-bit shift amount 10 into an n-bit shift value 14. Shift data 16 is coupled to a selective "1's" complement 18, which if the shift data 16 is positive, it is changed to a negative value using "1's" complement. Otherwise, if the shift data 16 is negative it is unchanged by the selective "1's" complement 18. The negative shift value 20 and the shift value 14 are coupled to an n-bit arithmetic logic unit 22. The negative shift value 20 and the shift value 14 are coupled to a barrel shifter 24. The n-bit arithmetic logic unit 22 has a carry bit 26. If the carry bit 26 has a value of "0" (there is no carry bit) then there will be an overflow in the barrel shifter 24. Whereas, if the carry bit 26 has a value of "1" (there is a carry bit) then there will not be an overflow in the barrel shifter 24.

To better understand how the typical DSP shift overflow detection logic circuit shown in FIG. 1 works an example of the data values and their manipulation follows. There are thirty six bits for the shift value and the shift data. The shift data has the value of 0001001110110001 . . . and the shift amount is five. The six bit shift amount is decoded to a thirty six bit shift value which is 000000000000000000000000000000100000. Since only the fifth bit is on there is a shift left by five. Reversing the order of the shift value gives the value of 000001000000000000000000000000000000. The shift data is positive so the "1's" complement is taken producing a negative shift data of 1110110001001110 . . . The reversed order shift value is added to the negative shift data (000001000000000 . . . +1110110001001110 . . . =11100000100111 . . . ) which has no carry, therefore there will be a left shift overflow.

Figure 2B:
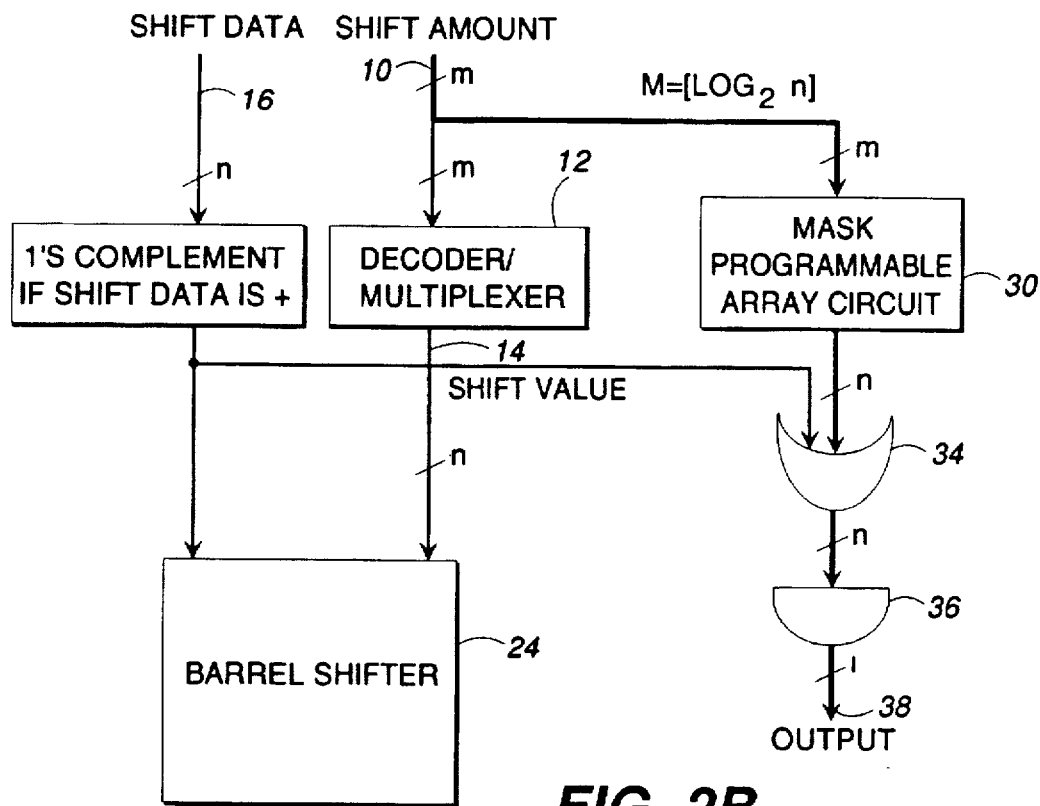
FIGS. 2a and 2b are mask programmable array shift overflow detection logic circuits.
Figure 2A:
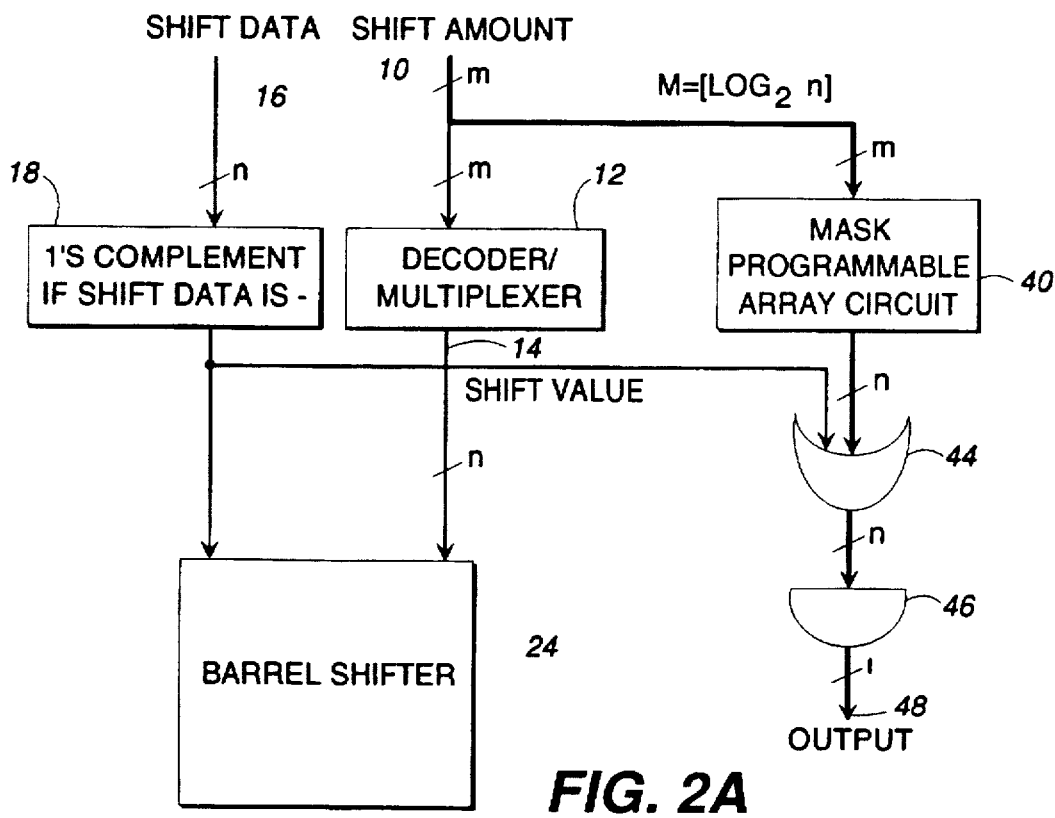

Referring to FIG. 2a there is shown the present invention mask programmable array shift overflow detection logic circuit included in an integrated circuit. A shift amount 10 is coupled to a decoder/multiplexer 12 and a mask programmable array pattern circuit 30. The decoder/multiplexer 12 decodes the $\lceil \log_2 n \rceil$-bit shift amount 10 into an n-bit shift value 14. Shift data 16 is coupled to a selective "1's" complement 18, which if the shift data 16 is positive, it is changed to a negative value using "1's" complement. Otherwise, if the shift data 16 is negative it is unchanged by the selective "1's" complement 18. The negative shift value and the output of the mask programmable array pattern circuit 30 are coupled to an n-bit OR gate array 34. The output of the n-bit OR gate array 34 is coupled to an n-bit input AND gate 36 having an output 38. The negative shift value 20 and the shift value 14 are coupled to a barrel shifter 24. If the output 38 has a value of "0" then there will be an overflow for the left shift operation in the barrel shifter 24. Whereas, if the output 38 has a value of "1" then there will not be an overflow for the left shift operation in the barrel shifter 24.

FIG. 3a shows the unique n-bit output for each shift amount 10 produced by the mask programmable array circuit 30 included in an integrated circuit. The unique n-bit output can be represented by output=(i+1) number of zeros concatenated with (n−1−i) number of ones where i=input and n=the number of bits of the data. A shift amount 10 having the value of zero produces an output of one "0" and n−1 "1's". A shift amount 10 having the value of one produces an output of two "0's" and n−2 "1's". This pattern follows until for a shift amount 10 having a value of n produces an output of n "0's".

Referring to FIG. 2b there is shown another embodiment of the present invention mask programmable array shift overflow detection logic circuit included in an integrated circuit. A shift amount 10 is coupled to a decoder/multiplexer 12 and a mask programmable array pattern circuit 40. The decoder/multiplexer 12 decodes the $\lceil \log_2 n \rceil$-bit shift amount 10 into an n-bit shift value 14. Shift data 16 is coupled to a selective "1's" complement 42, which if the shift data 16 is negative, it is changed to a positive value using "1's" complement. Otherwise, if the shift data 16 is positive it is unchanged by the selective "1's" complement 42. The positive shift value and the output of the mask programmable array pattern circuit 40 are coupled to an n-bit AND gate array 44. The output of the n-bit AND gate array 44 is coupled to an n-bit input OR gate 46 having an output 48. The positive shift value and the shift value 14 are coupled to a barrel shifter 24. If the output 48 has a value of "1" then there will be an overflow for the left shift operation in the barrel shifter 24. Whereas, if the output 48 has a value of "0" then there will not be an overflow for the left shift operation in the barrel shifter 24.

FIG. 3b shows the unique n-bit output for each shift amount 10 produced by the mask programmable array circuit 40 included in an integrated circuit. The unique n-bit output can be represented by output=(i+1) number of logical ones concatenated with (n−1−i) number of logical zeros where i is the input and n is the number of bits of the data. A shift amount 10 having the value of zero produces an output of one "1" and n "0's". A shift amount 10 having the value of one produces an output of two "1's" and n−2 "0's". This pattern follows until for a shift amount 10 having a value of n produces an output of n "1's".

The mask programmable array circuits 30 and 40 included in an integrated circuit, while they can be a field programmable array, programmable logic array, or simple AND and OR gates, were implemented as a mask programmable array. Mask programmable arrays are commonly known as gate arrays and macrocell arrays. Gate arrays have a large number of gates which can be connected to build any logical function.

To better understand how the present invention mask programmable array shift overflow detection logic circuit shown in FIG. 2a works an example of the data values and there manipulation follows.

There are n=thirty six bits for the shift value and the shift data. The shift data has the value of 0001001110110001 . . . and the shift amount m=five. Referring to FIG. 3a it can been seen that the mask programmable array circuit 30 produces an output of 000000111111111111111111111111111111 for the shift amount of five. The shift data is positive so the "1's" complement is taken producing a negative shift data of 1110110001001110 . . . The output of the mask programmable array circuit 32 which has a value of 000000111111111111111111111111111111 is ORed with the shift data has the value of 0001001110110001 . . . which produces the value of 111110111111111111111111111111111111. This output from the OR circuit 34 is coupled to the thirty six bit input AND gate 36 which produces an output 38 with the value of "0".

Since the output 38 has a value of "0" there will be an overflow in the barrel shifter 24. Whereas, if the output 38 had a value of "1" then there will not be an overflow in the barrel shifter 24.

Utilizing post-layout simulation, the critical time delay path for the circuit shown in FIG. 1 from the shift amount 10 to the carry bit 26 was determined.

This critical time delay path consists of the delay of the decoder/multiplexer 12 and the delay of the n-bit arithmetic logic unit 22 which is relatively large because of the many logic levels. Utilizing pre-layout simulation, the critical time delay path for the present invention shown in FIG. 2a from the shift amount 10 to the output 38 for overflow detection was determined. This critical time delay path of less logic levels consists of the delay of the mask programmable array pattern circuit 30, the delay of the n-bit OR gate array 34 and the delay of the n-bit input AND gate 36.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure as well as specific boolean types of logic may be varied substantially without departing from the spirit of the invention and the exclusive use of all modifications which come within the scope of the appended claim is reserved.

What is claimed:

1. A method for determining shift overflow in a binary digital circuit having an n-bit shift data and an m-bit shift amount, the method comprising the steps of:

producing an n-bit output from the m-bit shift amount;

converting selectively an n-bit shift data to an opposite sign n-bit shift data by converting a positive n-bit shift to a negative n-bit shift data;

ORing logically said n-bit output and said negative n-bit shift data producing an n-bit ORed output; and ANDing logically each of said n-bit ORed outputs producing an overflow output.

2. The method as recited in claim 1 wherein the said n-bit output further comprises:

(i+1) number of logical zeros concatenated with (n−1−i) number of logical ones where i is an input and n is a number of bits of data.

3. The method as recited in claim 1 wherein the step of converting selectively comprises taking ones complement of the n-bit shift data.

4. The method as recited in claim 1 wherein the step of producing an n-bit output from the m-bit shift amount comprises a programmable logical array.

5. The method as recited in claim 4 wherein said programmable logic array is a mask programmable logic array.

6. The method as recited in claim 4 wherein said programmable logic array is a field programmable logic array.

7. A method for determining shift overflow in a binary digital circuit having an n-bit shift data and an m-bit shift amount, the method comprising the steps of:

producing an n-bit output from the m-bit shift amount;

converting selectively an n-bit shift data to an opposite sign n-bit shift data by converting a negative n-bit shift to a positive n-bit shift data;

ANDing logically said n-bit output and said positive n-bit shift data producing an n-bit ANDed output; and ORing logically each of said n-bit ANDed outputs producing an overflow output.

8. The method as recited in claim 7 wherein the said n-bit output further comprises:

(i+1) number of logical ones concatenated with (n−1−i) number of logical zeros where i is an input and n is a number of bits of data.

9. An integrated circuit including a circuit for determining shift overflow in a binary digital circuit having an n-bit shift data and an m-bit shift amount, the device comprising:

a logic array for producing an n-bit output from the m-bit shift amount;

a conversion circuit for selectively converting a signed n-bit shift data to an opposite signed n-bit shift data, wherein said conversion circuit converts a positive n-bit shift to a negative n-bit shift data;

a logical circuit comprising OR logical gate for ORing logically said n-bit output and said negative n-bit shift data producing an n-bit ORed output and AND logical gate for ANDing logically each of said n-bit ORed outputs producing an overflow output.

10. The integrated circuit as recited in claim 9 wherein the said n-bit output further comprises:

(i+1) number of logical zeros concatenated with (n−1−i) number of logical ones where i is an input and n is a number of bits of data.

11. The integrated circuit as recited in claim 9 wherein said conversion circuit comprises a circuit for taking ones complement of the n-bit shift data.

12. The integrated circuit as recited in claim 9 wherein said logic array is a programmable logical array.

13. The integrated circuit as recited in claim 12 wherein said programmable logic array is a mask programmable logic array.

14. The integrated circuit as recited in claim 12 wherein said programmable logic array is a field programmable logic array.

15. An integrated circuit including a circuit for determining shift overflow in a binary digital circuit having an n-bit shift data and an m-bit shift amount, the device comprising:

a logic array for producing an n-bit output from the m-bit shift amount;

a conversion circuit for selectively converting a signed n-bit shift data to an opposite signed n-bit shift data, wherein said conversion circuit converts a negative n-bit shift to a positive n-bit shift data;

a logical circuit comprising AND logical gate for ANDing logically said n-bit output and said positive n-bit shift data producing an n-bit ANDed output and OR logical gate for ORing logically each of said n-bit ANDed outputs producing an overflow output.

16. The integrated circuit as recited in claim 15 wherein the said n-bit output further comprises:

(i+1) number of logical ones concatenated with (n−1−i) number of logical zeros where i is an input and n is a number of bits of data.

* * * * *